Oct. 30, 1962  J. B. WISE  3,061,075
CONVEYORS
Filed Sept. 23, 1960  5 Sheets-Sheet 2
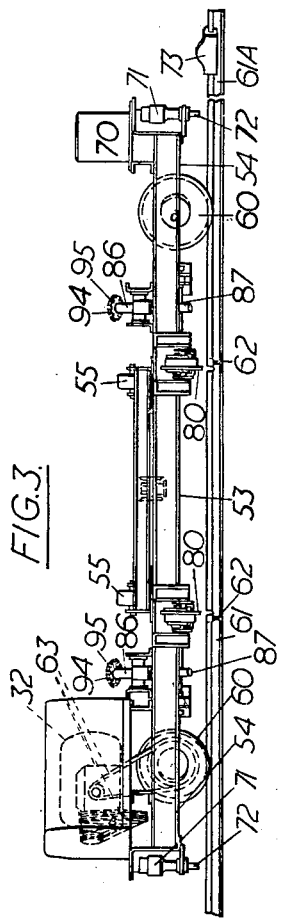
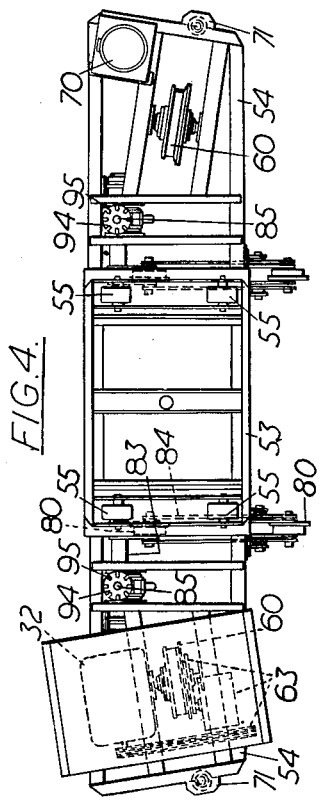
Inventor
JOHN B. WISE
By Mason, Fenwick & Lawrence
Attorneys Oct. 30, 1962   J. B. WISE   3,061,075
CONVEYORS
Filed Sept. 23, 1960   5 Sheets-Sheet 3
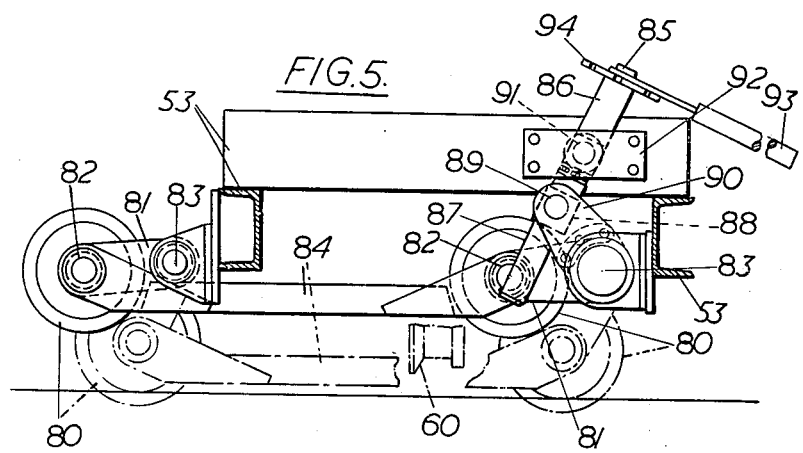
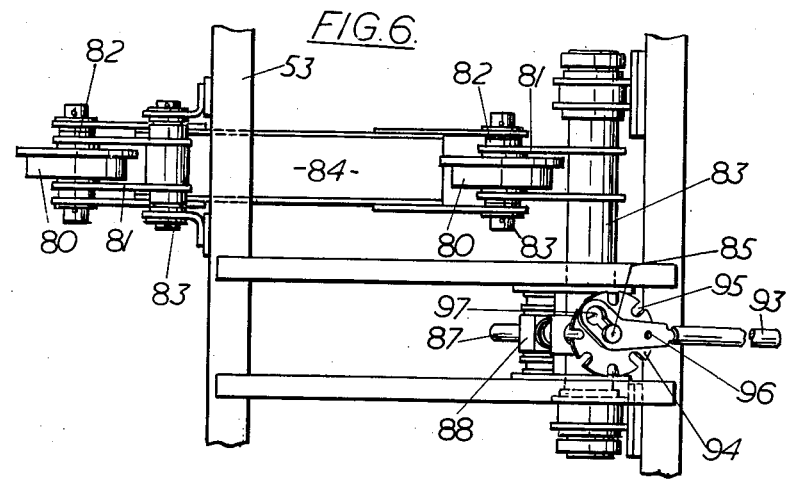
Inventor
JOHN B. WISE
By
Mason, Fenwick & Lawrence
Attorneys

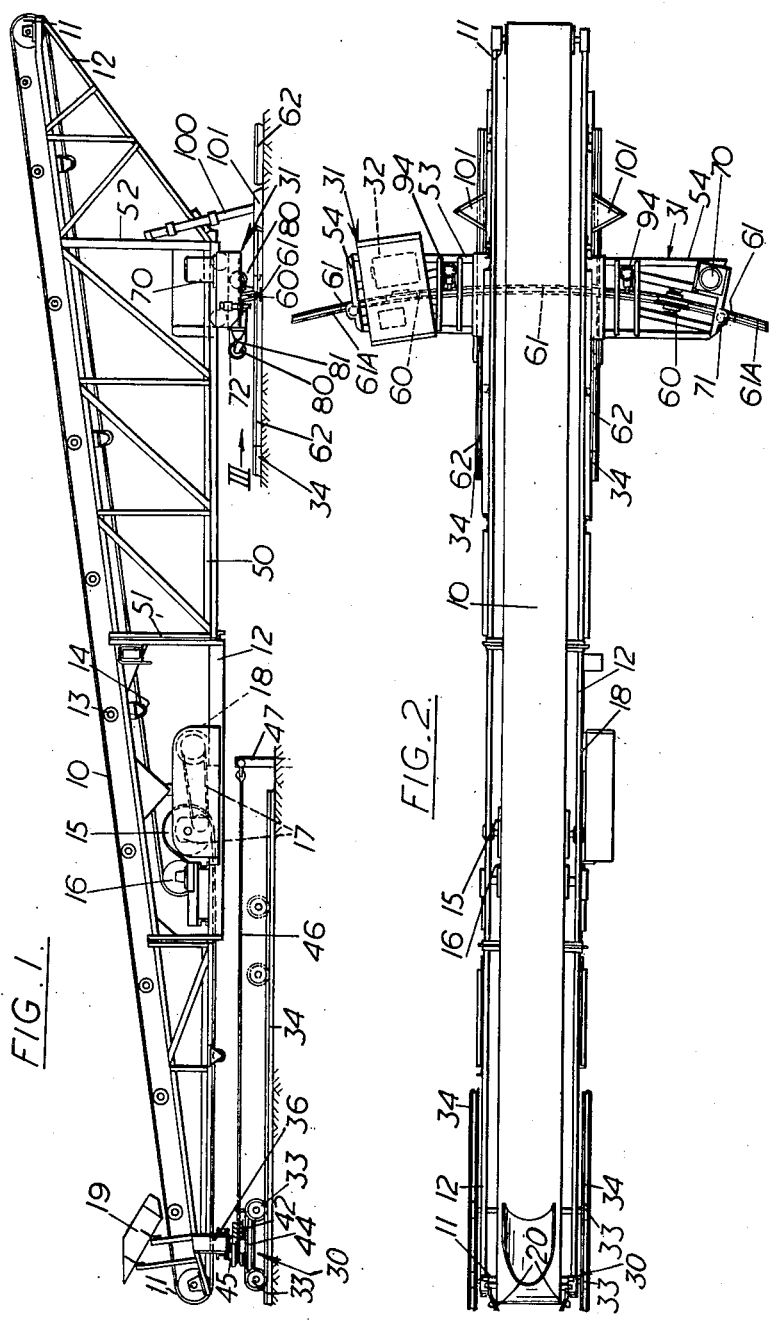

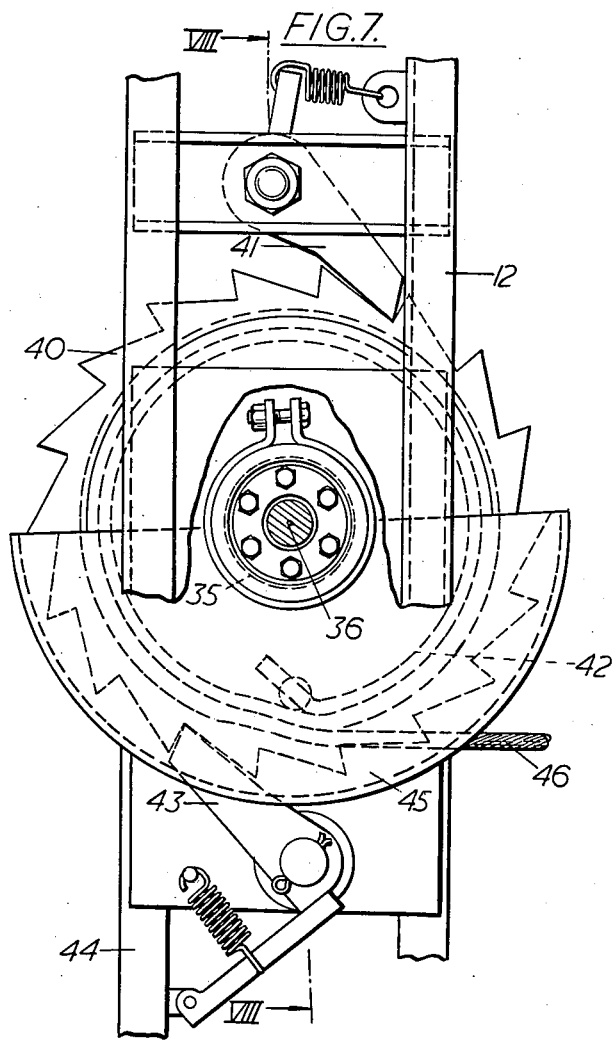

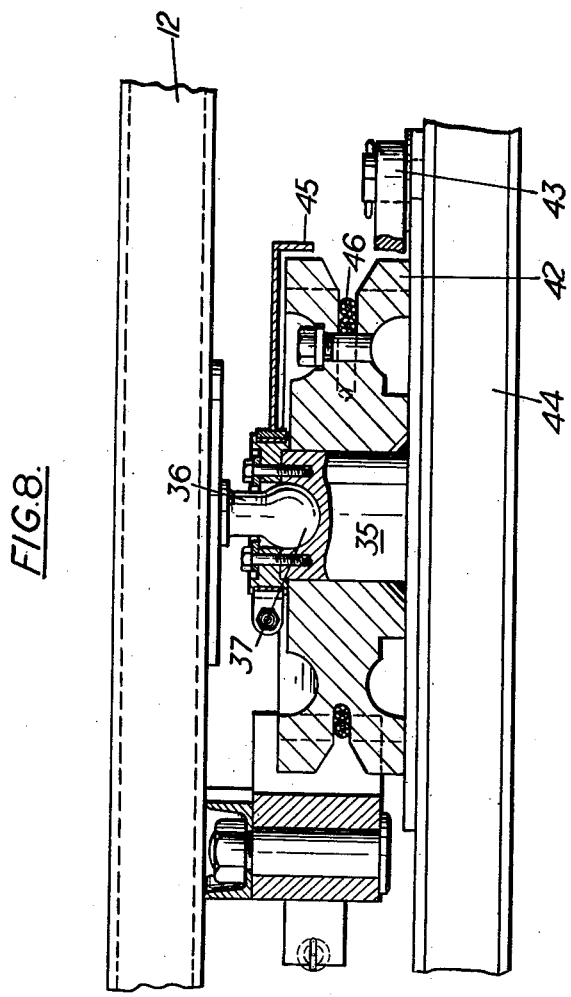

United States Patent Office 3,061,075
Patented Oct. 30, 1962

3,061,075
CONVEYORS
John B. Wise, Glasgow, Scotland, assignor to Mavor & Coulson Limited, Glasgow, Scotland
Filed Sept. 23, 1960, Ser. No. 58,113
7 Claims. (Cl. 198—126)

This invention relates to conveyors of a type devised to receive mineral or other material, to convey the material to a delivery zone and to distribute the material there; and such conveyors are referred to herein as distributing conveyors.

It is customary to use such a conveyor in co-operation with at least one other conveyor, referred to herein as a supply conveyor, that is movable at a rate proportional to the through-put of the conveyors.

The object of the present invention is to provide a distributing conveyor which will work in an improved manner to distribute the material supplied to it.

The invention is a distributing conveyor comprising a frame with a supply end and a delivery end, the supply end having a swivel mounting upon an advancing bogie and a length of the frame towards the delivery end having a longitudinal frame track, means for propelling said bogie, a traversing bogie in operative connection with said frame track, by which traversing bogie the frame is supported and guided, supporting wheels on the traversing bogie arranged to run on a transverse ground track, and a power unit on the traversing bogie for propelling it with the frame slowly to-and-fro sidewise so that the frame swivels about the swivel mounting as the advancing bogie travels towards the traversing bogie.

Preferably, the means for propelling the advancing bogie derives its propulsive power from the power unit on the traversing bogie. Thus, there may be interposed between the frame and the advancing bogie a mechanism which is actuated by the swivelling frame, and the advancing bogie may have a haulage gear which is wound stepwise by said mechanism.

The traversing bogie may have a jacking mechanism comprising normally idle wheels which are carried by arms adapted to be swung down to bring these wheels into engagement with a longitudinal ground track and to be forced to raise said bogie with the conveyor frame into a position clear of the transverse ground track. The frame, when so positioned, can be maintained stationary by the jacking mechanism while the traversing bogie is advanced to a new position along the longitudinal frame track.

The frame, near the delivery end, may have a dependent presser for smoothing the surface of the delivered material in preparation for the next advance of the conveyor.

An example of the distributing conveyor will now be described with reference to the accompanying drawings in which:

FIG. 1 is an elevation and FIG. 2 is a plan of the distributing conveyor.

FIG. 3 is an elevation of the traversing bogie as viewed in the direction of the arrow III in FIG. 1; and FIG. 4 is a corresponding plan.

FIG. 5 is an elevation of jacking mechanism, as viewed in FIG. 1, incorporated in the traversing bogie; and FIG. 6 is a corresponding plan showing a jack component of this mechanism.

FIG. 7 is a plan of ratchet mechanism and haulage gear on the advancing bogie; and FIG. 8 is a section on the line VIII—VIII of FIG. 7.

With reference to the drawings, the distributing conveyor includes, as the conveyor proper, an endless conveying belt 10 which passes around terminal rollers 11 at opposite ends of the distributing conveyor frame 12. Series of idler rollers 13 and 14 on the frame respectively support the upper conveying stretch of the belt and its lower stretch, which is led around a driving drum 15 associated with a guide pulley 16. The driving drum is driven through appropriate gearing 17 by an electric motor 18 mounted as usual on the conveyor frame 12.

At the supply end of the distributing conveyor there is mounted on its frame a chute 19 for guiding the material from a supply conveyor (referred to later herein) to the upper stretch of the distributing conveyor belt. Moreover, a pair of hitch links 20 (FIG. 2) connect the frame 12 to the supply conveyor. At the opposite extremity of the frame, the terminal roller 11 there serves as the delivery means; that is to say, the material passes with the belt 10 over this roller and is discharged to the ground forming the surface of the heap to be built by continued distribution of the material.

The frame 12 is supported by two bogies, one being an advancing bogie 30 at the supply end of the conveyor and the other a traversing bogie 31 towards the delivery end, this bogie 31 being propelled by an electric motor 32 mounted on it.

The advancing bogie 30 is a simple vehicle with two pairs of rail wheels 33 which ride upon the same longitudinal rails 34 as the supply conveyor, these rails extending as a ground track in the mid-direction of the distributing conveyor. The bogie has a central vertical pivot consisting of a block 35, FIGS. 7 and 8, with which a dependent bracket 36 on the conveyor frame 12 with a spherical end 37 has a swivel mounting, so that the frame can swivel about the axis of the pivot.

The bogie is provided with propulsion means consisting of haulage gear on the bogie chassis, and this haulage gear derives its actuating power from the motor 32 of the traversing bogie 31, the power being transmitted through the swivelling motion of the conveyor frame 12.

The haulage gear includes a ratchet-and-pawl mechanism 40, 41 and a rotatable winding drum 42, which is driven step-by-step by said mechanism. This drum is connected with the ratchet wheel 40 which is co-axial with the pivot block 35, being rotatable thereon. The driving pawl 41 of the mechanism is mounted on the conveyor frame 12. A detent pawl 43 is mounted on the bogie frame 44. The mechanism includes an adjustable cam 45 which co-operates with the driving pawl and determines its effective stroke; i.e. its arc of engagement with the ratchet teeth. In FIGS. 7 and 8 this cam 45 is shown in a neutral setting, in which the pawl 41 would be effective through an arc of about 180°. The drum 42 has a wire rope 46 connected to it and this rope extends forwards to an appropriate stationary anchorage 47 on the ground. The arrangement is such that the bogie 30 advances very slowly, pushing ahead of it the conveyor frame 12, which trails the supply conveyor hitched to this frame.

The traversing bogie 31 does not have a fixed connection with the conveyor frame 12. Instead, this bogie and the frame are movable relatively one to the other lengthwise of the frame. Thus, the frame is provided with a longitudinal track 50, FIG. 1, which in the example consists of two underslung rails extending from a frame member 51 about midway of the length of the frame to a frame member 52 towards its delivery end. The bogie 31 has a transverse chassis (FIGS. 2, 3 and 4), which is comparatively long, consisting of a middle portion 53 which comes underneath the conveyor frame 12 and a pair of side wings 54. The middle portion is provided with two pairs of upstanding wheels 55, upon which the rails of the frame track 50 bear. That is to say, these wheels 55 support the delivery end of the conveyor frame. The bogie also has two widely spaced dependent transverse wheels 60 which ride upon a transverse ground track. In the example, this track is a monorail which consists of a central length 61 with extensions 61A at opposite ends, and there are two transverse rail wheels 60, one on each side wing 54, which ride upon the monorail.

In the example, this rail 61, 61A is curved, its curvature being to a radius which may be approximately the same as the average distance of the bogie 31 from the pivot block 35. The monorail central length 61 is a component of a transportable crossing unit including also a pair of longitudinal rails 62 which are crossed by the monorail. The supply conveyor rails 34 are extended under the distributing conveyor to join into these longitudinal rails 62.

The equipment would include a second transportable crossing unit 61, 62 to be located beyond the first unit with the longitudinal rails of both units joining into one another.

The traversing bogie is provided with propulsion means, including the electric motor 32, which is mounted on one of the side wings 54 and drives the associated transverse wheel 60 slowly through triple reduction gearing 63.

The motor 32 of the traversing bogie 31 is under the control of electric switchgear housed in a casing 70 on one of the chassis wings 54, and this switchgear is actuated by a hand switch or switches (not shown) for starting and stopping the motor and also by two widely spaced reversing switches on the wings 54, the casings of these switches being indicated by 71. Each of these reversing switches includes a self-returning spring plunger 72. The two plungers 72 respectively co-operate with two cam-like abutments, one of which is indicated by 73, FIG. 3. These abutments are clamped to the monorail 61, 61A in selected positions, the settings of these abutments determining the limits of the swivelling motion of the distributing conveyor.

The traversing bogie 31 is provided with jacking mechanism consisting of two separate jacks. In the example, this mechanism includes two pairs of rail wheels 80, each pair forming parts of one of the jacks. Each pair of wheels is carried by a parallel linkage. In each jack this linkage includes two pivotal arms 81 (FIG. 1 and FIGS. 3 to 6) on the chassis of the bogie, there being one of these arms for each of said rail wheels 80, which are journalled in bearings 82 in the arms. The arms 81 are secured to a pair of parallel rotatable axles 83 which are journalled in the bogie frame, there being one of these arms on each of the axles. The bearings 82 of each jack are interconnected by a longitudinal link 84, which is a component of the parallel linkage. Each jack is a screwjack; it includes a hand-turnable screw 85 inside a twopart casing 86, 87 and a nut 88. This nut has a pivotal mounting 89 on an arm 90 which is secured to one of the axles 83. The part-casing 86 also has a pivotal mounting 91, which is provided on a bracket 92 secured to the chassis of the bogie 31. The screw 85 of each jack is turnable by means of a ratchet-type spanner 93. This spanner is engageable with a disc 94 that is secured to the top of the associated screw 85 and has peripheral notches 95 which are selectively engageable by a pin 96 in the spanner. The spanner has a keyhole slot 97 which is engageable with the head of the screw 84. To turn the screw 85 in either direction, a worker manipulates the spanner in a manner known in itself.

In the normal setting of the two jacks, the linkages 81, 84 hold the wheels 80 raised idly, as shown in full lines in FIG. 5.

The total arrangement is such that, when the propulsion motor 32 is in operation, the distributing conveyor is swivelled from one limit of its range of angular movement to the opposite limit by its traversing bogie 31. The driving pawl 41 turns the ratchet wheel 40, and therefore the rope drum 42, to the extent determined by the setting of the adjustable cam 45, so that the haulage gear is operated to pull the distributing conveyor a step forwards. In the advance movement, the traversing bogie is held against displacement in the lengthwise direction by the monorail 61 upon which its transverse wheels 60 ride, so that there occurs relative lengthwise movement between the conveyor frame 12 and the traversing bogie 31; and this bogie moves transversely along said rail and carries the conveyor frame with it. Therefore it will be manifest that the delivery end of the conveyor swings transversely from one side limit to the other of its range of movement and at the same time advances. As the conveyor reaches one end of its range of angular movement, the plunger 72 of the reversing switch adjacent to this end engages the abutment 73 there; and the motor 32 is reversed. Thus, the conveyor is swivelled in the return direction, and is traversed to the opposite limit of its range, where reversal again occurs by co-operation between the plunger 72 of the other reversing switch and the other cam-like abutment (not shown). In the example, the ratchest-and-pawl mechanism being single-acting, the driving pawl 41 is returned idly and no advance step is imparted to the frame 12. It will be obvious that a double-acting ratchet-and-pawl mechanism could be used, in which even the frame 12 would be advanced a step in each swivelling direction.

Thus, in the continuation of the combined swivelling and advance motion of the conveyor, the material is delivered uniformly over the total area within the limits of the conveyor's range.

The conveyor frame 12, beyond its rails 50 which bear upon the traversing bogie, has secured to it a leg 100 with a wide foot 101 serving as a so-called grader to reduce bumps and fill hollows on the surface of the delivered material.

When the distributing conveyor has advanced to the limit permitted by the underslung rails 50 supported by the traversing bogie 31, it is necessary to stop the operation of the conveyor and re-position the traversing bogie in order that the work of the conveyor can be continued. Accordingly, the motor 32 is switched off when the frame 12 is fully advanced and in its mid-position, with the jacking wheels 80 directly above the longitudinal rails 62 of the first crossing unit 61, 62. The traversing bogie 31 is jacked up by screwing down (by means of the spanners 91) the linkages 81, 83 to bring its rail wheels 80 into engagement with the longitudinal rails 62 and to raise the bogie in such a manner that its transverse wheels 60 are raised clear of the monorail length 61. Thereafter the traversing bogie 31 is advanced to the forward limit of the underslung rails 50. When the bogie 31 has been re-positioned in this way, the jacks are unscrewed to lower the bogie into its working position on the second crossing unit 61, 62, now positioned to receive the bogie. The unscrewing is continued until the linkages 81, 83 with their wheels 80 are raised again into the inoperative position. At any appropriate time the first crossing unit 61, 62 is transported into position beyond the now active second crossing unit and the track 34 under the distributing conveyor is extended to join the second crossing unit.

The distributing conveyor is intended to work in cooperation with a supply conveyor of a kind sometimes known as a "shuttle conveyor." This shuttle conveyor receives the conveyed material from a long main conveyor extending from the place where the material is produced or supplied. For instance, waste material from mining operations may be supplied to the main conveyor for eventual spreading by the distributing conveyor as a flat-topped heap or bing. The main conveyor works in a fixed location and is of fixed length for some working period. The shuttle conveyor forms in effect an extension of the main conveyor, but the shuttle conveyor moves along rails, namely the rails 34, throughout the working period so that the overall length of the two conveyors continuously extends. The shuttle conveyor is hitched to the distributing conveyor, as already described by the links 20, the two conveyors being arranged end to end; and it is from the distributing conveyor, in the example, that the shuttle conveyor derives its movement.

I claim:

1. A distributing conveyor comprising a frame with a supply end and a delivery end, a length of the frame towards the delivery end including a longitudinal frame track, an advancing bogie on which said supply end has a swivel mounting, a traversing bogie in operative connection with said frame track, the distributing-conveyor frame being supported and guided by said traversing bogie and said traversing bogie being movable relatively to said advancing bogie lengthwise of the frame track, means for forwardly propelling said advancing bogie towards said traversing bogie, and means for propelling the traversing bogie with the frame slowly to-and-fro sidewise so that the frame swivels about the swivel mounting and the advancing bogie travels towards the traversing bogie.

2. A distributing conveyor according to claim 1 in which the means for propelling the advancing bogie comprise a haulage gear on this bogie, a mechanism on this bogie connected to the haulage gear for operating said gear, and an operative connection between said mechanism and the distributing-conveyor frame through which connection the to-and-fro swivelling motion of said frame is applied to said mechanism.

3. A distributing conveyor according to claim 2 in which the mechanism on the advancing bogie includes a ratchet-and-pawl device of which the pawl is connected to the distributing-conveyor frame and the ratchet is a wheel that is connected to a winding drum incorporated in the haulage gear.

4. A distributing conveyor according to claim 1 in which the distributing-conveyor frame, near the delivery end thereof, has a dependent presser for smoothing the surface of the delivered material in preparation for the advance of the conveyor with the advancing bogie.

5. A distributing conveyor comprising a frame with a supply end and a delivery end, a length of the frame towards the delivery end including a longitudinal frame track, an advancing bogie on which said supply end has a swivel mounting, supporting wheels on the advancing bogie arranged to run on a longitudinal ground track, a traversing bogie in operative connection with said frame track, the distributing-conveyor frame being supported and guided by said traversing bogie and said traversing bogie being movable relatively to said advancing bogie lengthwise of the ground and frame tracks, means for forwardly propelling said advancing bogie along said ground track towards said traversing bogie, supporting wheels on the traversing bogie arranged to run on a transverse ground track, means for propelling the traversing bogie with the frame slowly to-and-fro sidewise along said ground track so that the frame swivels about the swivel mounting, and a jacking mechanism on the traversing bogie comprising normally idle wheels which are carried by arms adapted to be swung down to bring these wheels into engagement with the longitudinal ground track and to be forced to raise the traversing bogie with the distributing-conveyor frame into a position clear of the transverse ground track.

6. A distributing conveyor comprising a frame with a supply end and a delivery end, a length of the frame towards the delivery end including a longitudinal frame track, an advancing bogie on which said supply end has a swivel mounting, a traversing bogie in operative connection with said frame track, the frame being supported and guided by said traversing bogie and said traversing bogie being movable relatively to said advancing bogie lengthwise of the frame track, a power unit on the traversing bogie for propelling it with the frame slowly to-and-fro sidewise so that the frame swivels about the swivel mounting, and means deriving propulsive power from said power unit for forwardly propelling said advancing bogie towards said traversing bogie.

7. A distributing conveyor according to claim 6 in which the means for propelling the advancing bogie comprise a haulage gear on this bogie, a mechanism on this bogie connected to the haulage gear for operating said gear, and an operative connection between said mechanism and the distributing-conveyor frame through which connection the to-and-fro swivelling motion of said frame is applied to said mechanism.

References Cited in the file of this patent

UNITED STATES PATENTS

| | | |
|---|---|---|
| 825,292 | Bergeret | July 10, 1906 |
| 855,425 | Arden | May 28, 1907 |